United States Patent [19]

Laipenieks

[11] 4,221,633
[45] Sep. 9, 1980

[54] METHOD AND APPARATUS FOR CONTROLLABLY RECYCLING THE SOLIDS CONTENT OF THE EFFLUENT FROM AN ASBESTOS-CEMENT PRODUCTS FORMING PLANT

[75] Inventor: Juris Laipenieks, Englewood, Colo.

[73] Assignee: Johns-Manville Corporation, Denver, Colo.

[21] Appl. No.: 893,218

[22] Filed: Apr. 4, 1978

[51] Int. Cl.$^2$ .............................................. D21H 3/66
[52] U.S. Cl. .................................... 162/154; 162/189; 162/190; 162/253; 162/258; 162/263; 162/264
[58] Field of Search ............... 162/189, 190, 198, 154, 162/252, 253, 258, 263, 264, DIG. 9, DIG. 11, DIG. 10, 49, 262; 210/195.5, 195.50, 197

[56] References Cited

U.S. PATENT DOCUMENTS

| | | | |
|---|---|---|---|
| 1,872,480 | 8/1932 | Maust | 162/190 |
| 4,092,338 | 5/1978 | Tossey | 210/197 |
| 4,096,028 | 6/1978 | Rosenberger | 162/DIG. 10 |

Primary Examiner—S. Leon Bashore
Assistant Examiner—Peter Chin

Attorney, Agent, or Firm—Robert M. Krone; Joseph J. Kelly; Gregory W. O'Connor

[57] ABSTRACT

Waste water effluent from online production machinery and/or clean-off water from shut-down machinery is deposited in a settling tank in which the solids settle out. Water, relatively clear of the solids, is returned to the production plant. A slurry containing a high concentration of these solids is, depending on the percentage of solids, either returned to the production machinery via a slurry tank or returned to the settling tank for further concentration. The degree of concentration of solids in the slurry tank is carefully controlled in order to permit the addition of these otherwise wasted solids to the virgin asbestos-cement slurry in the various production machineries. This addition of the otherwise wasted solids is carefully monitored at each of the production machinery installations in order to provide proper quality control of the product produced thereby. This system may further include an effluent level sensor in the settling tank in order to optimize the clarity of the clean water return as well as a pH control system which can be used to aid in precipitating out the various dissolved solids, and to chemically condition the various fluids in the effluent return system, resulting in improved quality control of the asbestos-cement end product.

21 Claims, 1 Drawing Figure

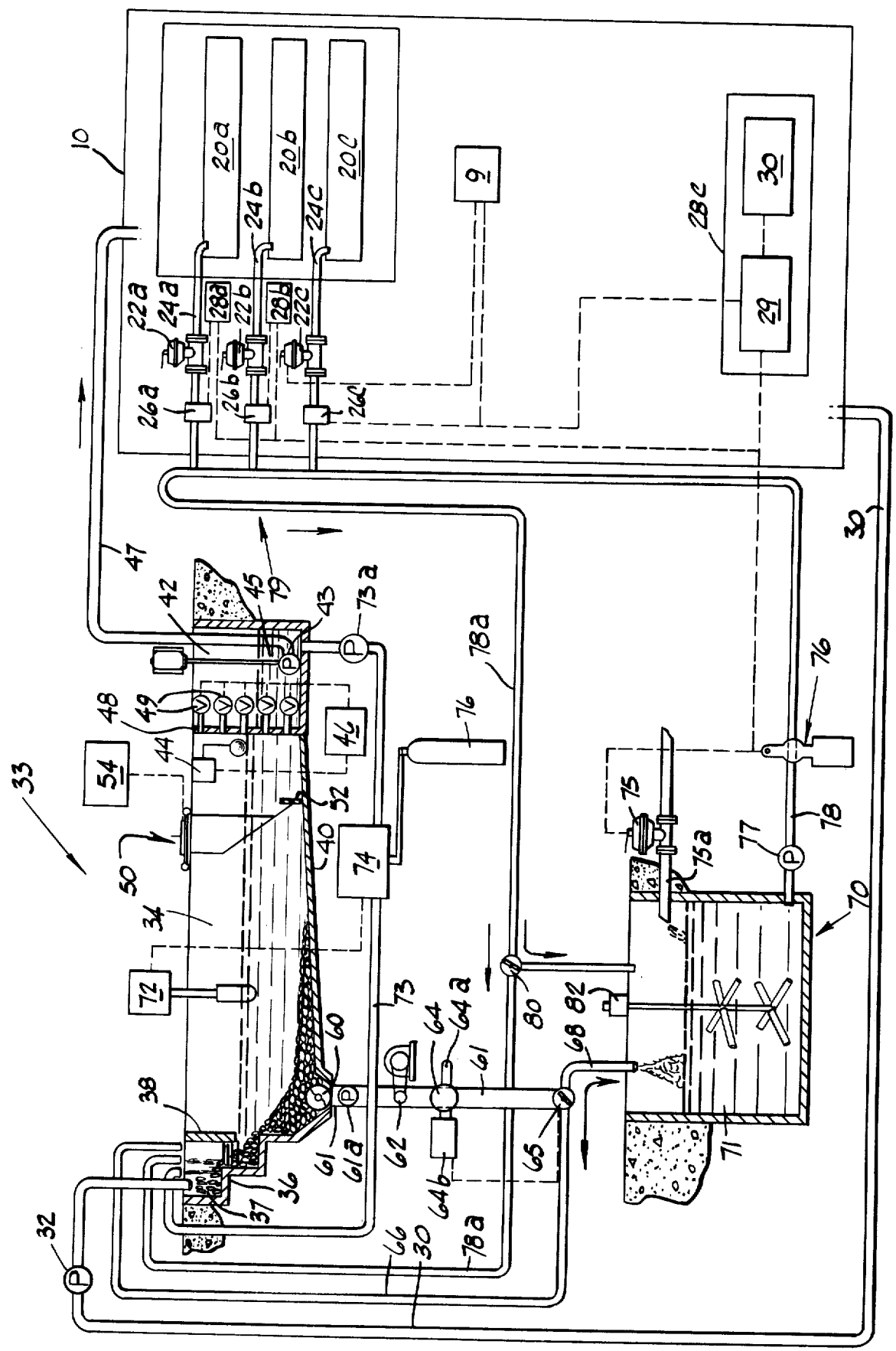

METHOD AND APPARATUS FOR CONTROLLABLY RECYCLING THE SOLIDS CONTENT OF THE EFFLUENT FROM AN ASBESTOS-CEMENT PRODUCTS FORMING PLANT

BACKGROUND OF THE INVENTION

1. Field of the Invention

The present invention relates to systems for returning various asbestos-cement plant effluents for use in the production of and incorporation directly into the asbestos-cement products of said production plant. Such asbestos-cement products may include pipe of various sizes, sheet and sheet-like products such as panels, and shingles with or without decorative surface treatment. Such products are generally produced from an aqueous slurry which may include various types of asbestos fibers, cellulose fibers, a source of silica such as silica sand, diatomaceous earth, or a silica flour, a cement material such as portland cement, and/or similar materials. In the production of these materials large quantities of water containing a fraction of these solid materials and certain minor percentages of additives is generated. Also, when these machines are not producing such products, they must be thoroughly cleaned lest the solid products coalesce in the various parts of these machines, making them relatively unusable. This cleaning and machine shutdown for felt changes and for weekends produces further large amounts of water containing widely varying fractions of these asbestos-cement solids and additives.

2. Description of the Prior Art

In general, attempts to return or recycle effluents from the various product making machinery in an asbestos-cement plant has been limited to the return of clarified or generally clear water. In such a system, plant effluents containing varying percentages of the asbestos-cement solids are collected in large tanks or pools. Here the solids are permitted to settle to the bottom of the tank or pool, and the relatively clear water is returned to the production machinery and added to the asbestos-cement slurry in amounts as needed, or the clarified effluent water is used to clean out the various machinery when such machinery is shut down.

The solids, having settled out, are disposed in either one of two ways. The first of these methods requires at least two very large settling tanks or pools. These tanks or pools would perhaps be more accurately described as ponds of 250 to 400 feet in length and width. Plant effluent is permitted to flow into one of these ponds. The excess of clarified water, that is water that has not evaporated from the pond and is of the proper cleanliness, is returned to the production plant for whatever uses to which it may be put. The solids, on the other hand, are allowed to accumulate in this pond until such accumulation substantially fills the pond. At this point the plant effluent is shifted to flow into the other of the two ponds since the first pond is filled with plant effluent solids, is substantially useless for further effluent clarification. The remaining water in this first pond is allowed to evaporate. This permits heavy machinery to be moved into the pond in order to break up the accreted solids and remove them to a land fill remote from the plant. Alternatively, the pond is covered with fill dirt, thus becoming a relatively useless piece of real estate. The second of the prior art methods of disposing of the solids consists of returning the relatively concentrated solid effluent from the settling tank or pond to a drying drum. The drying drum consists of a porous belt passing through a vat of the effluent slurry. This slurry passes through the belt arranged over the drum such that the solids are filtered out. The drum containing the precipitated solids is scraped to deposit the solids in the form of wet mud into waiting dump trucks to be subsequently transported to a land fill disposal.

Both of the above outlined prior art disposal methods result in a huge solids waste disposal problem. Presuming a production facility has an output of approximately 100,000 tons of asbestos-cement products per year, it is not unusual for 3,000 to 4,000 tons of waste solids per year to be disposed of by one of these two methods.

SUMMARY OF THE INVENTION

Contrary to the above outlined effluent disposal systems, the present invention proposes that by forming a slurry of solids derived from plant effluents, and precisely controlling the concentration of these solids, this slurry can be incorporated directly into the virgin asbestos-cement slurry used in the asbestos-cement production machinery. Thus, not only can 100% of the waste water as clarified water be used by the production plant, but also substantially all of the asbestos-cement solids collected from the plant effluent can be used.

More specifically, the present invention includes a clarifier concentrator tank having a volume capacity so as to permit not only the settling out of solids from the plant effluent generated during normal production, but also be able to contain all waste water and plant effluent from the shutdown and cleanup operation of all plant machinery. A portion of the plant effluent in the form of a slurry containing a predetermined minimum percentage of asbestos-cement solids is passed to a slurry tank. In this slurry tank, dilution water is added to control more precisely the solids percentage. The thus altered plant effluent becomes a source of precisely controlled amounts of asbestos-cement slurry which is continuously added to the asbestos-cement product making machinery, incorporating the otherwise wasted asbestos cement solids into the asbestos-cement products at a rate of up to about 4 parts of these solids to about 96 parts virgin solids.

It is an object of this invention to provide a method of utilizing substantially all of the asbestos-cement solids contained in the waste effluent of an asbestos-cement product production plant.

It is another object of the present invention to provide a system whereby 100% of the clarified water obtained from those plant effluents is utilized again by the production plant.

It is a further object of the present invention to provide method and apparatus for controlling the acidity or alkalinity of asbestos-cement containing plant effluents in order to aid in the further precipitation of dissolved waste solids from said plant effluents and to provide clean water derived from said plant effluents for reuse by the production plant.

BRIEF DESCRIPTION OF THE DRAWING

The single FIGURE in the drawing is a schematic of the overall plant effluent return system in accordance with the present invention.

DETAILED DESCRIPTION OF THE PREFERRED EMBODIMENT

Referring to the drawing, an asbestos-cement product production plant is shown generally at 10. It is understood, of course, that production plant 10 includes substantially all machinery and apparatus necessary for the production of asbestos-cement products. Such machinery and apparatus could include apparatus for storing the various components of the asbestos-cement products in dry powdered form. The plant further includes a plurality of asbestos-cement product making machinery shown here as 20(a), 20(b) and 20(c).

These machines could, for example, comprise asbestos-cement pipe making machines of the type disclosed in U.S. Pat. No. 2,929,447, which patent is hereby specifically incorporated by reference. Of course other asbestos-cement product making machinery could be contained in plant 10, for example, machines for making corrugated or flat asbestos-cement sheets. Also, while three such machines are shown in the FIGURE, any number of asbestos-cement product making machines could be included, their number being limited only by engineering constraints well within the purview of one of ordinary skill in the art. Such asbestos-cement product making machines work on the principle as disclosed in the above-referenced U.S. patent. That is, a thin slurry or water suspension of asbestos fiber with or without cellulose fibers, silicas and or other silica-containing finely divided material, and a cementitious product, for example portland cement, is contained in a slurry vat. A sieve cylinder is rotated through the slurry contained in this vat. Most of the asbestos-cement solids are deposited on the surface of the sieve cylinder, while a major portion of the water passes through the porous surface of the sieve cylinder. This wet but agglomerated mass of solids is picked up on an endless belt called the felt, and in the case of a pipe making machine, is caused to roll up on a mandrel, thus forming an asbestos-cement cylinder. Again in the case of the pipe making machine, the thus formed asbestos-cement cylinder, after having been pressed with presser rollers to drive out an even greater amount of the water, is separated from its mandrel and in various subsequent steps is permitted to air dry, then is normal cured under water or is cured in an autoclave, and otherwise prepared for shipment.

Other asbestos-cement product making machinery differ from one another in many aspects but generally all such machinery have incorporated therein a slurry vat of some nature. Each asbestos-cement product making machine, whatever its form, would generate, during a normal production run as well as during machine shut down, fairly large amounts of water having widely varying percentages of asbestos-cement solids contained therein. This water, known collectively as plant effluent, is shown schematically being removed from the plant facility by conduit 30.

A preferred method of providing asbestos-cement product making machinery 20(a), 20(b) and 20(c) with asbestos-cement solids containing effluent, so that such solids may be incorporated directly into the asbestos-cement products made thereby is set forth as follows.

One such method proposes collecting all plant effluents and permitting a majority of solids contained in said effluents to precipitate or settle out of the main body of the water constituting these collected plant effluents. As the plant effluents flow to this collection point, or after a selected period of time, relatively clear or clarified water is removed from the collection point for return to the production plant or facility. However, rather than removing or otherwise disposing of the accumulating solids fraction of the plant effluents, the present invention includes the steps of transferring, pumping or otherwise moving the concentrated solids of the plant effluents from the settling or collection point in the form of a slurry and carefully monitoring the density, and thus the solids concentration, of this slurry. If this measurement shows that the slurry has less than a certain predetermined percentage of solids contained therein, the just measured slurry is returned to the above mentioned collection point for further settling and/or concentration. If, however, this slurry contains at least the required predetermined percentage of solids, it is transferred to a second collection point for further processing in preparation for its incorporation in the asbestos-cement product making process. This further processing includes the step of measuring in a substantially continuous fashion the density and thus the solids content of the slurry at this second collection point and, if necessary to meet certain predetermined production requirements, further diluting the slurry to cause it to have a certain precise solids content. Finally, the slurry having the above noted precise solids content is transferred to the asbestos-cement product making machinery for use therein.

The amount of solids provided to the asbestos-cement product making machinery by the above proposed effluent return method is quite critical to the quality of the products made thereby. This is so since these solids are essentially dead, that is the cement contained therein has been fully hydrated and therefore cannot contribute, and indeed may detract from, the structural integrity of these products. In order to prevent deleterious effects, the total amount of these solids should not exceed a certain predetermined amount. It has been found that this amount should not exceed 4% of the total asbestos-cement solids making up the product. In order to control this critical factor a further step includes carefully monitoring the thus provided solids preferably at each asbestos-cement product making machine. This monitoring would include determining the rate of flow of the slurry derived from the concentrated solids effluent being provided each machine. From this rate figure and the density as determined from the continuous monitoring at the second collection point as set forth supra, the rate of mass flow in terms of for example pounds per hour is quite easily determined. Also, from the pounds per hour determination it is quite easy to determine the total amount of solids provided to each asbestos-cement product making machine via the effluent return system during a predetermined period of time, for example one shift or one production run.

Further refinements of the proposed effluent return method could include monitoring the pH of the plant effluent to the first collection point and modifying that pH in order to reach a predetermined point. For example, should the pH be too high, which is usually the case, carbon dioxide could be added to a portion of the plant effluents and returned to the above collection point. Presuming the pH of the plant effluent is approximately 13, this portion of the instant invention would include monitoring this pH, adding carbon dioxide to a fraction of the effluent, and returning this fraction to reduce the total plant effluent pH to approximately a pH of 10 or lower as may be desired. Such a pH control would have the advantages of conditioning the clarified water for return to the production plant as well as causing the precipitation and settling out of the dissolved solids from the plant effluent.

Another refinement of the above proposed effluent return method includes determining the level of the free surface of the plant effluents at the collection point and removing the clarified water from the plant effluent collection point at a level just below the above determined free surface. Water removed from this point has the greatest clarity, that is the least amount of suspended solids as well as other contaminants. This is so because water removed right at the free surface contains some portion of foam which inevitably collects on this surface. This foam contains a fairly large quantity of contaminants. Drawing off the clarified water at a point below the free surface foam prevents recontaminating the generally clear water by the foam.

An apparatus which is especially adapted and desirable in performing the above outlined effluent return method is set forth as follows.

Shown in the drawing associated with each asbestos-cement product making machine 20(a), 20(b) and 20(c) are pinch valves 22(a), 22(b) and 22(c) respectively. These pinch valves control the flow of the solids containing slurry derived from plant effluents, this slurry being returned to each of said machines via supply conduits 24(a), 24(b) and 24(c) respectively. Each of these conduits brings a controlled amount of this slurry to the respective slurry vats of each of the machines. Each of these conduits includes sonic flow meters 26(a), 26(b) and 26(c) (of a known type) and mass flow totalizing apparatus, the operation of which instrumentation will be more fully explained shortly.

As stated above, conduit 30 is schematically shown carrying plant effluent which constitutes the combined waste water of all the asbestos-cement making machinery. This effluent, by gravity flow or via pump 32, is brought to a collection point here shown as clarifier concentrator tank 33, which includes settling tank 34. Tank 34 includes a step-like spillway 36 into which the plant effluent 37 is discharged. Tank 34 further includes sloping bottom portion 40, terminating at one edge adjacent clear water tank 42. Spillway 36 further includes weir 38 which spreads the flow of effluent 37 across the full width of tank 34.

Tank 34 also includes a traveling bridge 50. This bridge has a scraper 52 which rides along the bottom of sloping portion 40 of tank 34 bringing solids which have fallen out of suspension towards solids screw 60 located in the lower-most portion of tank 34. Bridge 50 is constructed such that scraper 52 is lifted from the effluent contained in tank 34 when returning to the shallow end of tank 34 (from left to right as shown in the drawing). Traveling bridge 50 is operated by control circuitry 54 which can be set to cause traveling bridge 50 to scrape only selected fractions of sloping bottom 40. For example, 54 can be set to return traveling bridge 50 to only a third of the way up sloping surface 40 from solids screw 60. Alternately, for example, circuitry 54 could be set to return bridge 50 to one-half the length of tank 34 before dropping the scraper 52 and returning towards solids screw 60.

Clear water separating tank 42 has a pump 43 for displacing clear water 45 from said clear water separating tank through conduit 47 back to plant 10. Clear water 45 enters clear water separating tank via a selected one of a series of valves 49 passing through wall 48. Liquid level sensor 44 via control circuitry 46 opens whichever one of valves 49 lies a controlled amount below the free surface of the effluent 37 in settling tank 34. Only this one valve is opened, that is, the valve lying below the surface of effluent 37, since this is the area from which can be derived the clearest fraction of water from tank 34. This water is the cleanest water in the sense that it contains less suspended particulates as well as soluble contaminants which tend to concentrate in foam lying on the surface of effluent 37.

Because the instant invention amounts to a completely closed recycling system, the acidity or alkalinity of the recycled fluid becomes most critical. To this end the clarifier separator tank has associated therewith pH control apparatus. In one of its preferred forms such apparatus includes pH sensing meter 72 of a known type. A signal generated by pH sensor 72 is used to control carbon dioxide injector 74. Injector 74 is of a known type and is operated under the control of pH sensor 72 to add selected amounts of gaseous $CO_2$ derived from liquid carbon dioxide tank 76 to a portion of the water drawn from tank 34 to pump 73(a). The thus acidified water is returned to tank 34 via conduit 73. In this way not only is the pH of the clear water return controlled but the precipitation and settling out of dissolved solids is brought about.

As stated previously, through the action of gravity and traveling bridge 50 a large concentration of solid effluents begins to build up at the lowest portion of clarifier separator tank 33. Screw 60 aids in fluidizing this material permitting it to pass via conduit 61 and pump 61(a) to delumper 62. The purpose of delumper 62 is to smooth out the solids in the concentrated solids effluent passing through 61, thus making an homogenous slurry of the solids. The thus formed slurry passes through density gauge 64. Density gauge can take the form of any of a number of known fluid flow density gauges. Preferably, such a density gauge utilizes the attenuation of gamma rays passing through the fluid to be measured. In this preferred embodiment, gamma ray source 64(a) is positioned on one side of conduit 61 and gamma ray detector 64(b) is positioned on the other side. The degree to which the gamma rays emanating from source 64(a) are attenuated by the slurry in 61 and detected by detector 64(b) is proportional to the density and thus directly proportional to the solids content therein. The signal derived from detector 64(b) is processed by known means in order to control electrically operated three-way valve 65. The exact manner in which valve 65 is controlled by the density sensed by density gauge 64 will be fully explained hereinafter.

Valve 65 is connected to conduit 61 such that flow therethrough can be routed either back to settling tank 34 via conduit 66 or transferred directly to a second collection point, shown here as slurry tank 70, via conduit 68. Slurry tank 70 is normally positioned horizontally adjacent clarifier separator tank 34. It contains agitator 82 which keeps the slurry in suspension and mixes dilution water derived from conduit 75(a) controlled by valve 75 and the slurry 71 derived from conduit 68. The diluted slurry then passes via pump 77 through conduit 78 and on to manifold 79. As can be seen, manifold 79 has connected thereto each of the asbestos-cement product making machine supply conduits 24(a), 24(b) and 24(c). Conduit 78 includes return length 78(a) which returns constantly circulating slurry either to the slurry tank or to the tank 34, depending on the position of manual valve 80. Conduit 78 passes through density gauge 76 of for example the gamma ray attenuating type similar to density gauge 64 supra. This density gauge produces a signal which among other things controls the operation of dilution water control valve 75 in a manner to be set forth more completely below.

It can be seen that the disclosed effluent return system is capable of providing selective amounts of substantially clear (10 to 15 parts per million suspended solids) water to the production plant 10 and simultaneously or alternatively providing various asbestos-cement product producing machineries in that plant with controlled amounts of asbestos-cement solids, in the form of a slurry having a large relative percentage of such solids suspended therein. However, as a practical matter, in order to provide the asbestos-cement product making machines with usuable amounts of the otherwise wasted solids and not adversely affect the quality of the product, the concentration and thus the net amounts of these solids must be precisely controlled. The disclosed invention successfully provides a system to accomplish this very necessary control function.

The solids contained in slurry derived from the plant effluents can be provided to asbestos-cement product making machinery at a concentration of between 2% and 10% solids and preferably at about 3% to 7% solids without having deleterious effects on the physical characteristics of the products made thereby. In order to provide this precise control density, gauge 64 is set to operate valve 65 in such a way that only slurry having solids above a certain threshold percentage is permitted to pass through the conduit 68 into slurry tank 70. If the slurry passing through density gauge 64 is less than the required percentage, detector 64(b) positions three-way valve 65 in order to return this effluent via 66 to the clarifier separator tank 34 for further concentration. Clearly, this threshold percentage solids figure or threshold density is that equivalent to or greater than the percentage solids which is to be provided to each of the individual asbestos-cement product making machines 20(a), 20(b) or 20(c). Thus, for example, if the percentage solids to be provided these machines is 7%, the density gauge 64 should be set to permit concentrated effluent of greater than 7%, e.g. 10%, to pass to slurry tank 70 via the conduit 68. It can be seen that slurry tank 70 contains solids in the form of a concentrated effluent or slurry which can be readily incorporated in asbestos-cement products by the asbestos-cement product making machines in plant or facility 10. However, a further control step is necessary to insure product reliability. Density gauge 76 senses the density and thus the solids content of effluents passing through conduit 78. A signal generated by density gauge 76 which is proportional to the solids content is utilized in two ways. First, this signal controls the operation of pinch valve 75 which dispenses dilution water via conduit 75(a). Since the slurry in 78 is being constantly circulated by pump 77 through manifold 79, return conduit 78(a), and slurry tank 70, the concentration of solids in 70 can be deduced in a precisely controlled manner. Thus, for example, if density gauge 64 is set to provide a slurry with a solids content of 10% to slurry tank 70, density gauge 76 can be set to provide the precisely controlled concentration of solids at the exact solids percentage required by machines 20(a), 20(b) or 20(c) from 2% solids up to an undiluted 10% solids content.

As a further check on and control of the amount of solids derived from the concentrated solids effluent return system, the signal from density gauge 76 is combined electrically in a known manner with the electrical signal from sonic flow meter 26(c) as for example on strip chart recorder 29. Also, connected with strip chart recorder is electro mechanical totalizer 30. Both of these devices are located in conjunction with each of the asbestos-cement product making machines as set forth supra. Each machine operator has an instantaneous reading of the amount of solids being provided by the solids in the effluent return in terms of pounds per minute, as well as a cumulative figure on the amount of solids derived from the effluent derived slurry in terms of for example pounds per production run or pounds per shift.

In order to compensate automatically for changes in delivery pressure provided by pump 77 and concomitant solids delivery rate to each machine, each sonic flow meter 26(a), 26(b) and 26(c) controls each respective pinch or throttle valve via a pneumatic controller. Referring to the drawing, a typical control arrangement shows sonic flow meter 26(c) connected electrically with a conventional type pneumatic controller 9 which is in turn operatively connected to valve 22(c). Should the flow rate detected by sonic flow meter 26(c) fall below a particular predetermined set point, controller 9 would adjust valve 22(c) in order to increase the flow to the correct rate.

It can be seen from the above explanation of the preferred embodiment that the instant invention is a practical, viable system for fully utilizing the otherwise wasted asbestos-cement solids by incorporating these otherwise wasted solids directly into the ongoing production process for manufacturing asbestos-cement products. However, a further feature of the disclosed embodiment makes the system even more practical and desirable. As stated previously, water effluents containing asbestos-cement solids are generated during two operations, both during production and during shutdown of asbestos-cement product making machines. During shutdown, various vats and holding tanks associated with each machine are emptied of their contents. Various belts, felts, rollers and sieve cylinders are purged of asbestos-cement solids and contaminated water by using relatively clear, clean water. This shutdown and cleanup operation generates a vast quantity of plant effluents, which, unless the return system is properly proportioned, may otherwise be wasted. To this end, applicant proposes making the clarifier concentrator tank 33 of such a capacity as to completely contain the plant effluent generated by such a complete plant shutdown. Thus during weekends or prolonged holidays the asbestos-cement product making machines may be completely shut down and cleansed. The effluent return system as disclosed, however, can be maintained in a closed cycle readiness condition. In this condition, clarifier concentrator tank, although substantially full, has a ready supply of clean water in the clear water separating tank as well as concentrated solids effluent passing through conduit 61. Also slurry tank 70 can have a ready supply of asbestos-cement slurry of precisely controlled concentration circulating through conduit 68, manifold 79 and return conduit 78(a).

Also adding further versatility to the disclosed system, manual valve 80 is operted in the following manner. Should asbestos-cement product making machines, through a change in product specifications or indeed through the making of another product entirely, require an effluent derived slurry having a concentration of solids greater than that presently contained in slurry tank 70, manual valve 80 is positioned so as to channel the slurry contained in 78 back to settling tank 34. Thus the concentration of solids contained in tank 70 can be raised to the level of concentration set by density gauge 64. This is so since the slurry contained in 70 which had been diluted by dilution water provided via conduit 75 is no longer returned to slurry tank 70 but is rather sent back to settling tank 34 for further concentration. If necessary, density gauge 64 can be adjusted to provide an even higher concentration of solids to slurry tank 70 via conduit 68 in order to meet the higher concentration requirements of the new product run of asbestos-cement product making machinery contained in plant 10. Alternatively, pneumatic controllers such as controller 9 can be adjusted to change the rate set point of valves 22(a), 22(b) and 22(c) in order to increase the net flow of slurry to each machine. In this way the net rate at which solids are provided to each machine can be altered as required.

What is claimed is:

1. A system for recycling, to at least one asbestos-cement product making machine, a slurry containing asbestos-cement solids derived from the effluents generated by at least one asbestos-cement product making machine in a production plant, said effluents being generated during normal operation as well as during shutdown and clean-off of said at least one machine, said system comprising:
   (a) an effluent settling tank for containing said effluents operatively connected to said at least one machine;
   (b) a means for returning clear water from said settling tank to said production plant;
   (c) a slurry tank;
   (d) means, operatively connected to said settling tank and said slurry tank, for selectively providing to said slurry tank asbestos-cement slurry from said settling tank, said slurry having a concentration of asbestos-cement solids above a predetermined concentration;
   (e) means associated with said slurry tank for maintaining a concentration of said solids in said slurry tank at an amount equal to or less than said predetermined concetration; and
   (f) means for selectively providing to said at least one machine a controlled flow of slurry from said slurry tank.

2. A system as defined in claim 1, said means (d) comprising a valve having at least two positions, said valve in a first position of said two positions causing said slurry to return to said settling tank, and said valve in a second position of said two positions causing said slurry to pass into said slurry tank.

3. A system as set forth in claim 2 wherein said means (d) further comprises means for measuring the concentration of said solids in said slurry and means for controlling said valve in response to said means for measuring.

4. A system as set forth in claim 3 wherein said means for measuring comprises a gamma ray density gauge.

5. A system as set forth in claim 1 wherein said means (e) comprises a second valve for controlling the addition of diluting water to slurry contained in said slurry tank and further comprising second means for measuring the concentration of solids in said last named slurry and further including means for operating said second valve in response to the operation of said second measuring means.

6. A system as set forth in claim 1 wherein said settling tank comprises means for controlling the pH of the effluents contained therein.

7. A system as set forth in claim 1 wherein said effluent settling tank comprises means for detecting the level of effluents contained therein and means responsive to said level detecting means for removing clear water from the portion of said effluents contained in said settling tank located just below the free surface of said effluents.

8. A system as set forth in claim 1, said system further comprises a means for measuring the concentration of solids in the slurry flowing from said slurry tank to said at least one asbestos-cement product making machine, and further comprises means for measuring the rate of flow of said slurry to said machine and means for displaying the total amount of solids flowing to said machine resulting from the flow of said slurry.

9. A system as set forth in claim 5, wherein means (e) further comprises means for measuring the rate of flow of slurry from said slurry tank to at least said at least one asbestos-cement product making machine and further including means for displaying the total amount of solids flowing to said machine resulting from the flow of said slurry.

10. A system as set forth in claim 1 wherein said settling tank has a capacity so as to contain all effluents from all asbestos-cement product making machines contained in said production plant during production as well as all effluents resulting from cleanup operations of all said machines.

11. A system as set forth in claim 1 wherein said predetermined concentration ranges from 2% to 10% solids by weight.

12. A system as set forth in claim 1 wherein said means for controlling the concentration of said solids in said slurry tank maintains said last mentioned concentration between 3% and 7% of solids by weight.

13. A method for recycling to at least one asbestos-cement product making machine an aqueous slurry containing asbestos-cement solids derived from the effluents generated by at least one asbestos-cement product making machine in a production plant, said effluents being generated during normal operation as well as during shut-down and clean-off of said at least one machine, comprising the steps of:
   (a) transporting said effluents to a first collection point where asbestos-cement solids are permitted to concentrate by a process of precipitation and settling out of said solids from said effluents;
   (b) removing said solids in slurry form from said first collection point;
   (c) measuring the concentration of said solids in said slurry removed in step (b);
   (d) transporting said slurry to a second collection point when said concentration measured in (c) is greater than a predetermined value; and
   (e) providing at least one asbestos-cement product making machine with at least a portion of said slurry transported to said collection point in step (d).

14. A method as set forth in claim 13 further comprising the step of:
   (f) altering the concentration of said solids in said slurry transported to said second collection point so as to control the concentration of solids contained therein.

15. A method as set forth in claim 14 wherein step (f) further comprises measuring the concentration of solids in said slurry at said second collection point; and diluting said slurry with water to change said concentration to a second predetermined concentration.

16. A method as set forth in claim 13 further comprising the steps of measuring the concentration of solids contained in said slurry at said second collection point, and detecting the rate at which said solids in said slurry is provided to at least said asbestos-cement product making machine.

17. A method as set forth in claim 13 further comprising the steps of measuring the rate at which said solids in said slurry are provided said asbestos-cement product making machine, and displaying said rate to an operator of said machine.

18. A method as set forth in claim 15 wherein the predetermined concentration of step (d) is at least 2% by weight of solids.

19. A method as set forth in claim 18 wherein the predetermined concentration is approximately 10% by weight of solids.

20. A method as set forth in claim 13 further comprising the step of returning the slurry removed in step (b) to said first collection point when the concentration measured in step (c) is less than said predetermined concentration of solids.

21. A method as set forth in claim 15 wherein said second predetermined concentration is at least 3% of solids by weight and not more than 7% of solids by weight.

* * * * *